United States Patent
Zheng et al.

(10) Patent No.: US 9,204,363 B2
(45) Date of Patent: Dec. 1, 2015

(54) METHOD OF SENDING DATA

(75) Inventors: Zhi Zheng, Beijing (CN); Ling Qian, Beijing (CN); Lei Wang, Vancouver, WA (US); Zhisheng Niu, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 2304 days.

(21) Appl. No.: 11/702,553

(22) Filed: Feb. 6, 2007

(65) Prior Publication Data

US 2007/0230425 A1      Oct. 4, 2007

(30) Foreign Application Priority Data

Mar. 28, 2006    (CN) .......................... 2006 1 0071408

(51) Int. Cl.
    H04W 40/28      (2009.01)
    H04L 12/721     (2013.01)
    H04W 40/38      (2009.01)

(52) U.S. Cl.
    CPC ............... *H04W 40/28* (2013.01); *H04L 45/34* (2013.01); *H04W 40/38* (2013.01)

(58) Field of Classification Search
    CPC ....... H04W 40/28; H04W 40/38; H04L 45/34
    USPC ......... 370/338, 237, 328, 238, 248, 230, 401, 370/392; 709/223; 398/48
    See application file for complete search history.

(56) References Cited

U.S. PATENT DOCUMENTS

| | | | |
|---|---|---|---|
| 2003/0117966 A1* | 6/2003 | Chen | 370/255 |
| 2003/0126246 A1* | 7/2003 | Blouin et al. | 709/223 |
| 2003/0202476 A1 | 10/2003 | Billhartz et al. | |
| 2004/0146056 A1* | 7/2004 | Martin | 370/401 |
| 2004/0264372 A1* | 12/2004 | Huang | 370/230 |
| 2006/0268727 A1* | 11/2006 | Rangarajan et al. | 370/248 |
| 2007/0025353 A1* | 2/2007 | Nambisan et al. | 370/392 |
| 2007/0104107 A1* | 5/2007 | Alapuranen | 370/238 |
| 2008/0095058 A1* | 4/2008 | Dalmases et al. | 370/237 |
| 2008/0192713 A1* | 8/2008 | Mighani et al. | 370/338 |
| 2008/0310340 A1* | 12/2008 | Isozu | 370/328 |
| 2010/0014859 A1* | 1/2010 | D'Alessandro et al. | 398/48 |

FOREIGN PATENT DOCUMENTS

CN          1650573 A        8/2005

OTHER PUBLICATIONS

Rejection Decision issued on Mar. 23, 2012 with English translation for corresponding Chinese Patent Application No. 200610071408.3.
Chinese Office Action dated Mar. 24, 2011 and English translation of Chinese Office Action.

* cited by examiner

*Primary Examiner* — Kwang B Yao
*Assistant Examiner* — Syed M Bokhari
(74) *Attorney, Agent, or Firm* — Harness, Dickey & Pierce, P.L.C.

(57) ABSTRACT

A method of sending data from a source node in a wireless communications network is provided. In an example, the method includes selecting one of a plurality of available routing paths, from the source node to a destination node, on which to send data based on routing criteria specified by the source node.

14 Claims, 3 Drawing Sheets

METHOD OF SENDING DATA

PRIORITY STATEMENT

This application claims priority under 35 U.S.C. §119 to Chinese Patent Application No. 200610071408.3, filed Mar. 28, 2006, in the Chinese Patent Office (CPO), the disclosure of which is incorporated herein in its entirety by reference.

BACKGROUND OF THE INVENTION

1. Field of the Invention

Example embodiments of the present invention relate generally to a method of sending data, and, more particularly, to a method of sending data from a source node to a destination node.

2. Description of the Related Art

Ad-hoc On-demand Distance Vector (AODV) protocol is a method of routing messages between mobile devices. It allows these mobile devices, or nodes, to pass messages through their neighbors to nodes with which they cannot directly communicate. AODV does this by discovering the route(s) along which messages can be passed. AODV makes sure these routes do not contain loops (e.g., one or more Nodes which repeat) and tries to find the shortest route possible (e.g., based on delay, a number of visited Nodes or hops, etc.). AODV is also able to handle changes in routes and can create new routes if there is an error.

FIG. 1 illustrates a conventional AODV network 100. As shown in FIG. 1, the AODV network 100 includes Nodes 1, 2, 3, 4 and 5 with coverage areas 105, 110, 115, 120 and 125, respectively. Nodes which can communicate directly with other Nodes are referred to as "neighbors".

Each Node in the AODV network 100 keeps track of its neighbors by listening for "HELLO" messages that every Node broadcasts at fixed, periodic intervals. When a given Node desires to send a message to a non-neighbor Node, the Node broadcasts a Route Request (RREQ) message. The RREQ message includes a source identifier identifying the Node sending the RREQ message, a destination identifier identifying the non-neighbor Node to which the message is addressed, a lifespan of the message and a Sequence Number serving as a unique identifier for the message. The lifespan indicates a duration that the message is "active", after which no attempts to transfer the message to the destination non-neighbor Node will be performed by any Node.

FIG. 2 illustrates a conventional message routing process within the AODV network 100 of FIG. 1. In step S200, Node 1 determines to send a message to Node 3. As shown in FIG. 1, Node 1's neighbors are Nodes 2 and 4. Therefore, Node 1 cannot directly communicate with Node 3. Node 1 broadcasts a RREQ, which is received by Node 4 and Node 2. In this example, for the sake of simplicity, the destination identifier is "3" (i.e., to designate Node 3), the source identifier is "1" (i.e., to designate Node 1), the Lifespan is "3" (e.g., to designate a time duration, such as 3 seconds or 3 hops) and the Sequence Number is "0". Thus, the RREQ sent by the Node 1 may be expressed as [Destination identifier, Source identifier, Lifespan, Sequence Number] or [3, 1, 3, 0].

The RREQ [3, 1, 3, 0] is received by each of neighbor Nodes 2 and 4. In steps S205 and S210, Nodes 4 and 2, respectively, determine whether the destination identifier identifies a Node that is (i) known by Nodes 4 or 2, respectively or (ii) whether the receiving Node (e.g., Node 2 or 4) is identified by the destination identifier. If each of conditions (i) and (ii) are not met, the receiving Node rebroadcasts the received RREQ if the lifespan has not expired. Accordingly, in step S205, since Node 4 is not Node 3's neighbor and Node 4 is not Node 3, Node 4 rebroadcasts the RREQ, which is received by Node 5. It is understood that because Node 1 is Node 4's neighbor, Node 1 would also receive the RREQ, but because Node 1 is the original sending Node, this step has not been illustrated because the receipt of the rebroadcast RREQ would be ignored by Node 1. Also, while not shown, step S205, performed at Node 4, would then be performed at Node 5 after receiving the rebroadcast RREQ from Node 4, and so on.

Returning to step S210, Node 2 is a neighbor of Node 3 and therefore knows the route to Node 3. Node 2 then determines whether Node 2 is the Node identified by the destination identifier. Because Node 2 is not the destination entity, Node 2 sends a Route Reply (RREP) back to the Node 1 to indicate that a route to Node 3 has been found and also rebroadcasts the RREQ to Node 3. RREPs are similar to RREQs, but RREPs include a hop count (i.e., a number of Nodes separating the source or sending Node to the receiving or destination Node, e.g., Node 1 to Node 3 includes 2 hops) in place of the lifespan.

Node 3 receives the rebroadcast RREQ and determines whether conditions (i) and (ii) are met in step S215. Because condition (ii) is met (i.e., Node 3 is the Node identified by the destination identifier), Node 3 sends a RREP to Node 1 through Node 2 and does not rebroadcast the RREQ.

Node 1 receives the RREP from Node 3 and determines, based on the RREP's Sequence Number, whether to update a routing path to Node 3. Sequence numbers serve as time stamps by allowing Nodes to determine how "fresh" their information is with respect to other Nodes. Each time a Node sends a new message, the Sequence Number associated with the new message is incremented from a previously sent message. Each Node records the current (i.e., highest) Sequence Number of the Nodes it talks to. Higher Sequence Numbers indicate "fresher" or more up-to-date routes.

Referring to FIGS. 1 and 2, Node 1 forwards the RREP received from Node 3 to Node 4, which is forwarded to Node 5, and so on. Node 1 compares the received RREP with a stored route to Node 3 and determines that the RREP's Sequence Number is higher than its stored route. Accordingly, Node 1 updates its stored route with the route indicated by the RREP in step S225. Alternatively, the newly determined route is added as an alternate routing path, such that multiple routing paths are available from Node 1 to Node 3.

Once a routing path from a source Node to a destination Node is known, the source Node sends data to the destination Node until a Route Error Message (RERR) is received. The RERR indicates a broken link in one or more routing paths between the source Node to the destination Node. Whenever a Node receives a RERR, the Node examines its Routing Table and removes all the routes that contain the "bad" Nodes (i.e., the Nodes to which the source Nodes are no longer connected, at least through the old routing path).

Generally, a RERR is broadcast in response to three (3) situations. In a first scenario, a Node receives a data packet for forwarding but does not have a routing path to the data packet's destination. Thus, another Node (i.e., sending the data packet) erroneously thinks a correct routing path to the destination Node is through the Node not knowing the destination.

In a second scenario, a Node receives a RERR that causes at least one of its Routes to become invalidated. The Node sends out a RERR with all the new Nodes which are now unreachable. In a third scenario, the Node detects that it cannot communicate with one of its neighbors. The Node updates its route table to invalidate routes using the unreachable neighbor as a first hop. Then, the Node sends out a RERR indicating the neighbor is not connected, which invalidates those associated routing paths.

Traditional router vendors use a Command Line Interface (CLI) to support routing protocols which are implemented within various kinds of networks, such as the Internet. A CLI is a type of user interface to a computer's operating system or an application in which the user responds to a visual prompt by typing in a command on a specified line, receives a response back from the system, and then enters another command, and so forth. For example, the MS-DOS Prompt application in a Windows operating system is a CLI provision. The CLI permits a network manager to view statistics, make configuration changes and perform other administrative functions.

Router venders typically employ protocols which are best for the integrity of the system. Router vender protocols typically take into account administrative distance. Administrative distance is the feature used by routers to select a best path when there are two or more different routing paths from a given Node to the same destination using different routing protocols. Administrative distance defines the reliability of a routing protocol. Each routing protocol is prioritized by the router in order of most to least reliable using an administrative distance value.

For example, the CLI used by a router vender may be:

Ip route 192.0.0.0 255.0.0.0 135.252.20.1 120 such that all packets received from 192.0.0.0/255.0.0.0 are routed to router 135.252.20.1 if a path between a source Node and a destination Node, associated with an administrative distance value less than an administrative distance threshold (e.g., 120), is not available. For critical systems, such router-defined parameters support conservative protocols which protect the system. However, end users, which are in fact "hosts" in AODV networks, are not allowed to select between available paths, and instead are at the mercy of the protocols defined by the router venders.

SUMMARY OF THE INVENTION

An example embodiment of the present invention is directed to a method of sending data from a source node in a wireless communications network, including selecting one of a plurality of available routing paths, from the source node to a destination node, on which to send data based on routing criteria specified by the source node.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

Figure 1:
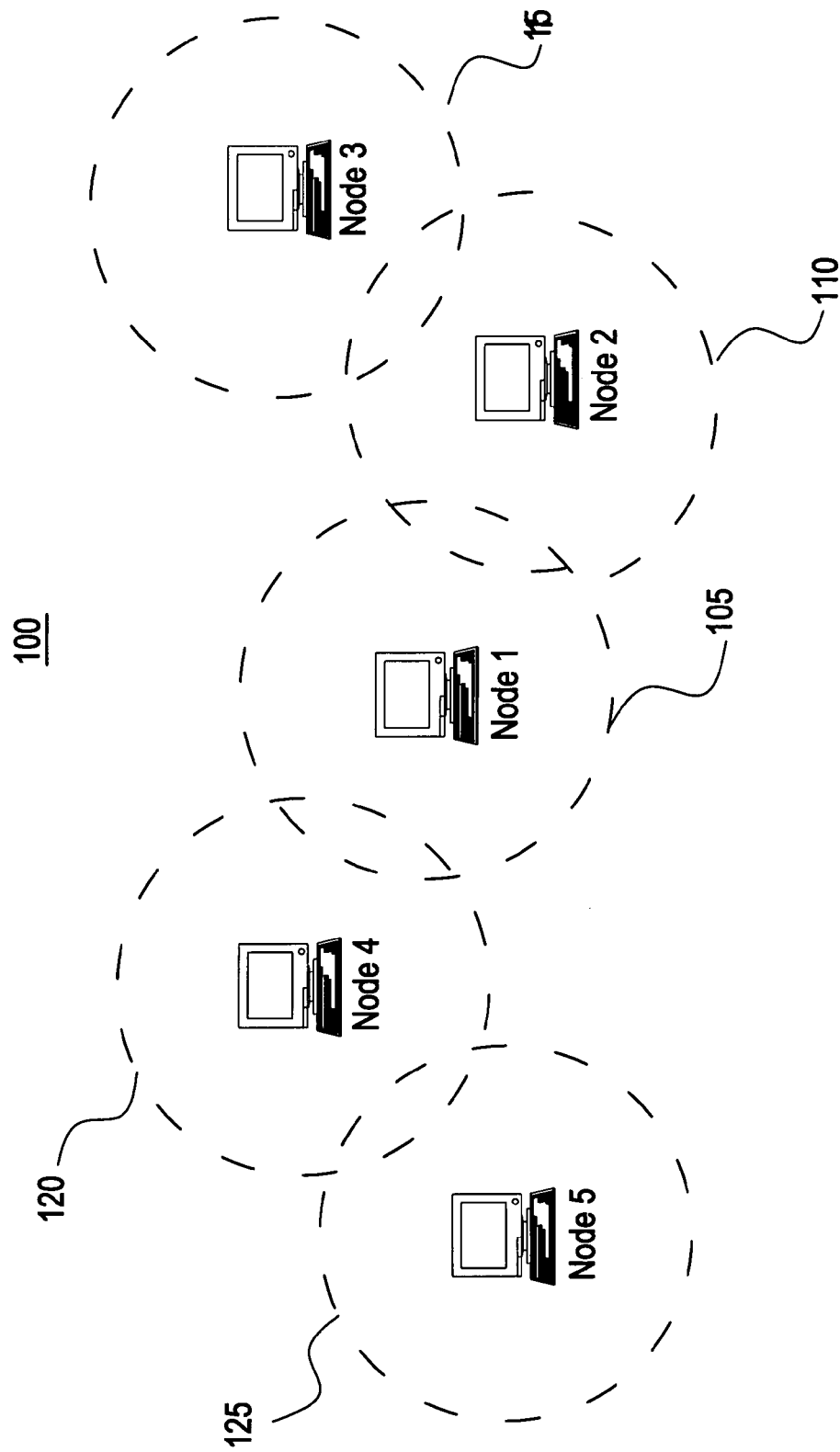
FIG. 1 illustrates a conventional Ad-hoc On-demand Distance Vector (AODV) network.
Figure 2:
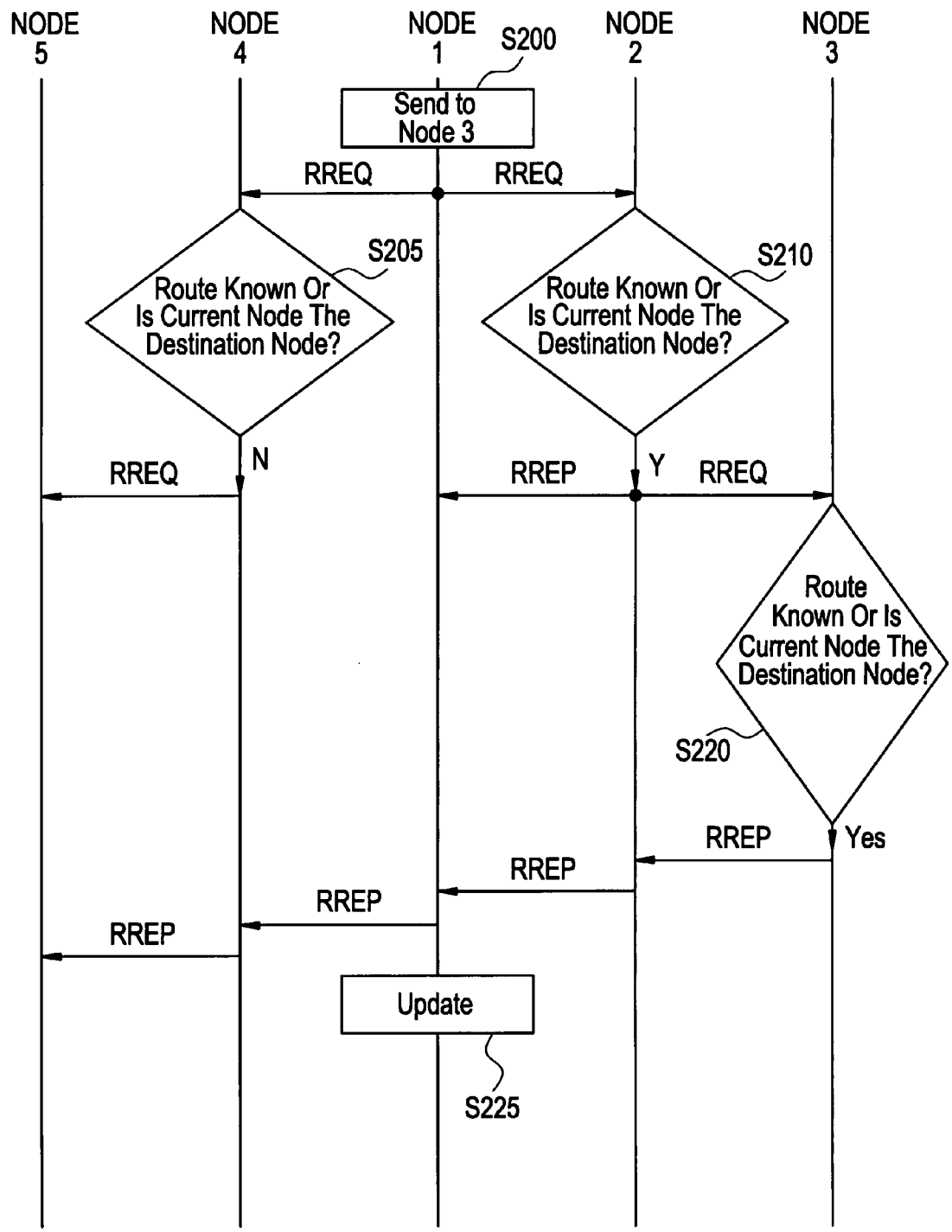
FIG. 2 illustrates a conventional message routing process within the AODV network of FIG. 1.
Figure 3:
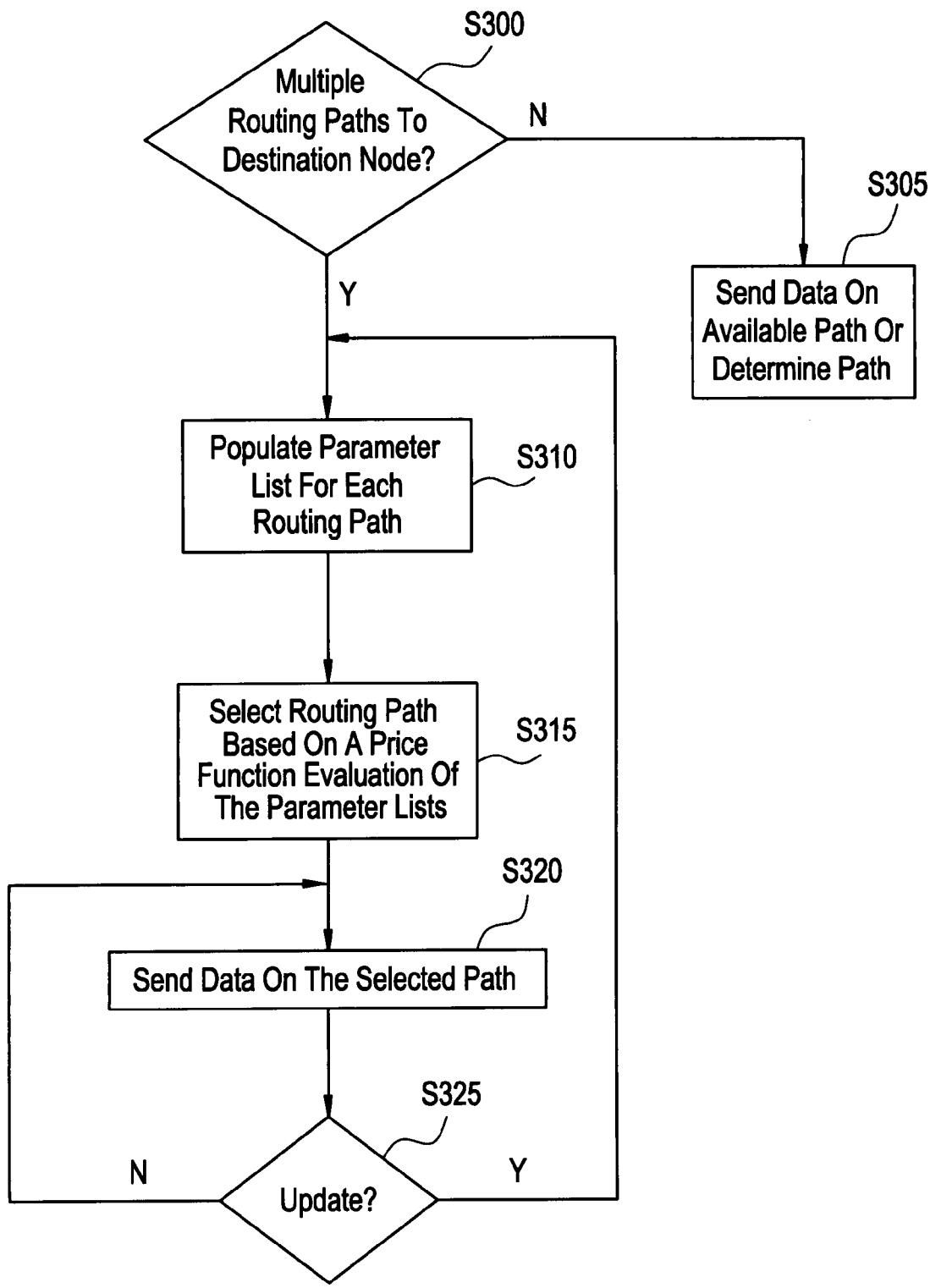
FIG. 3 illustrates a routing path selection process according to an example embodiment of the present invention.

FIG. 3 illustrates a routing path selection process according to an example embodiment of the present invention.

As discussed in the Background of the Invention section, a plurality of routing paths between a source Node and a destination Node may be available. Accordingly, at a time n, there are M routes to destination D, wherein M is an integer. In step S300 of FIG. 3, if M is not greater than or equal to 2, the process advances to step S305. In step S305, if the source Node wishes to send one or more data packets to the destination D, the source Node sends the data packets via the available path. Alternatively, if no routing path is available in step S305, the source Node broadcasts a RREQ, as discussed in the Background of the Invention section, to find an available routing path to the destination D.

In step S300, if two or more routing paths are available from the source Node to the destination D, the process advances to step S310. In step S310, the source Node populates a parameter list S for each of the plurality of routing paths. Each parameter list S includes one or more parameters. The one or more parameters within each of the parameter lists S constitute routing criteria which the source Node uses to rank the plurality of routing paths in order to select one of the routing paths on which to transfer data.

In an example, the routing criteria included as the one or more parameters within the parameter lists S are selected by an end user at the source Node. For example, the end user may configure the source Node (e.g., a cell phone, a PDA, a laptop computer, etc.) to include parameters in addition to parameters considered by routing vendors. As will be described later, the parameters selected by the end user for inclusion within the parameter lists S may be evaluated with a price function.

In an example, the populated parameter list S is defined as $$S_n^i \equiv (X_n^i, L_n^i, P_n^i, DELAY_n^i, BW_n^i)^T$$

wherein i is an ith routing path among the plurality of routing paths, n is a time measure, T means transpose, and the plurality of parameters included within the parameter list are defined as $X_n^i$ is a binary value (e.g., "0" or "1") indicating whether the ith routing path is a "selected" or primary routing path at time n. For example, if $X_n^i$ equals "1", the ith routing path is selected as a primary routing path at time n, and if $X_n^i$ equals "0", the ith routing path is not selected as a primary routing path at time n. Typically, only one path among the plurality of routing paths is the "selected" or primary path at any given time (e.g., time n), although as will be described later, a different routing path may be selected for a next time n+1;

$L_n^i$ is a number of hops to the from the source Node to the destination D along the ith routing path;

$P_n^i$ is a user-defined priority value (e.g., defined by a user of the source Node) for the ith routing path at time n;

$DELAY_n^i$ is a known delay (e.g., measured from a previous data packet forwarding process, estimated, etc.) from the source Node to the destination D along the ith routing path at time n; and $BW_n^i$ is a known bandwidth (e.g., measured from a previous data packet forwarding process, estimated, etc.) from the source Node to the destination D along the ith routing path at time n. In an example, the known bandwidth $BW_n^i$ is the bandwidth of the hop with the lowest bandwidth from the source Node to the destination D along the ith routing path at time n.

In step S315, at time n, the source Node selects one of the plurality of available routing paths based on one or more of the parameters populated within the parameter lists S to use as the primary routing path at time n+1. In other words, $\{S_n^i\}_{i=1}^M$ is used to determine $\{X_{n+1}^i\}_{i=1}^M$. The following examples are given with respect to two available routing paths as evaluated by different example price functions. However, it will be readily apparent to one skilled in the art how the below examples may scale so as to accommodate any number of available routing paths.

A price function is defined as $f(S_n^i; S_n^j)$, wherein $f(S_n^i; S_n^j)$ evaluates to one of "−1", "0" or "1". The price function $f(S_n^i; S_n^j)$ is used to compare an ith routing path with a jth routing path. Generally, the price function $f(S_n^i; S_n^j)$ evaluates to "−1" if the ith routing path is worse than the jth routing path, "0" if the ith routing path is the same as the jth routing path and "1" if the ith routing path is better than the jth routing path.

Examples of price functions will now be given. In a first example, the price function $f(S_n^i; S_n^j)$ is based on a number of hops in the ith and jth routing paths. Thus, the price function $f(S_n^i; S_n^j)$ evaluates to "1" if the ith routing path has fewer hops than the jth routing path, "0" if the ith and jth routing paths have the same number of hops and "−1" if the ith routing path has a greater number of hops than the jth routing path.

The first example price function may be executed at the source Node with a first executable program code segment (e.g., a plug-in). The Boolean logic of the first executable code segment may be expressed as follows:

```
If S(i).L < S(j).L then
    return 1;
else if S(i).L = S(j).L then
    return 0;
else
    return −1;            First Example Price Function
```

The first executable program code segment for the first example price function may be embodied as source code in programming languages including, but not limited to, Java, C, C++, Pascal, etc.

In a second example, the price function $f(S_n^i; S_n^j)$ is based on the user-defined priority value P. Thus, the price function $f(S_n^i; S_n^j)$ evaluates to "−1" if the user-defined priority value $P_n^i$ for the ith routing path is less than the user-defined priority value $P_n^i$ for the jth routing path, "0" if the ith and jth routing paths have the same user-defined priority value and "1" if the ith routing path has a greater user-defined priority value $P_n^i$ than the user-defined priority value $P_n^i$ for the jth routing path.

The second example price function may be executed at the source Node with a second executable program code segment (e.g., a plug-in). The Boolean logic of the second executable code segment may be expressed as follows:

```
If S(i).P < S(j).P then
    return −1;
else if S(i).P = S(j).P then
    return 0;
else
    return 1;             Second Example Price Function
```

The second executable program code segment for the second example price function may be embodied as source code in programming languages including, but not limited to, Java, C, C++, Pascal, etc.

In a third example, a hierarchical set of comparisons are used to evaluate the price function $f(S_n^i; S_n^j)$. In this example, a hierarchy of comparisons are used to evaluate the price function $f(S_n^i; S_n^j)$ such that fewer 0's are returned. First, the user-defined priority values P for the ith and jth routing paths are compared. If the user-defined priority values P for the ith and jth routing paths are not the same, the third example price function returns "1" or "−1" similar to the second example price function. Otherwise, the third example price function proceeds next by taking the number of hops into account. If the number of hops L for the ith and jth routing paths are not the same, the third example price function returns "1" or "−1" similar to the first example price function. Otherwise, the third example price function proceeds next by taking a current primary routing path status into account. If the ith routing path is the current primary routing path for time n (i.e., X=1 for the ith routing path at time n), then the third example price function returns "1". If the jth routing path is the current primary routing path for time n (i.e., X=1 for the jth routing path at time n), then the third example price function returns "−1". Otherwise, the third example price function returns "0".

The third example price function may be executed at the source Node with a third executable program code segment (e.g., a plug-in). The Boolean logic of the third executable code segment may be expressed as follows:

```
If S(i).P > S(j).P then
    return 1;
else if S(i).P < S(j).P then
    return −1;
else {
    If S(i).L > S(j).L then
        return −1;
    else if S(i).L < S(j).L then
        return 1;
    else {
        If S(i).X = 1 then
            return 1;
        else if S(j).X = 1 then
            return −1;
        else
            return 0
    }
}                         Third Example Price Function
```

While the first, second and third example price functions are above-described as evaluating two routing paths, it will be readily apparent that the additional iterations of the price function may be executed to compare any remaining available routing paths until a single routing path is designated (e.g., X=1 for only one routing path at time n+1) as the primary or "selected" routing path. For example, if there are three available routing paths, a first and second routing path are first compared with the above-process. The better of the two routing paths, as determined by the above price function, is then compared with the third routing path. The better routing path as determined by the second comparison is then considered to be the primary or "selected" routing path. It will be readily apparent how the above-described iterative process may be applied for any number of available routing paths.

After a routing path is selected in step S315, data packets are sent from the source Node to the destination D along the selected routing path (e.g., the primary routing path as determined by the price function implementation(s)) in step S320 at time n+1.

In step S325, the source Node determines whether the selected routing path should be updated. For example, if a REER is received indicating that the selected routing path is no longer valid, the source Node determines that the selected routing path needs to be updated. In another example, the source Node may periodically update the selected routing path (e.g., when time n+1 expires, again when time n+2 expires, and so on). If the source Node determines to update the selected routing path, the process returns to step S310 where the parameter lists S are updated for a next routing path selection at step S315; otherwise, the process returns to step S320 and the source Node continues to transmit data packets on the selected routing path without an update.

Example embodiments of the present invention being thus described, it will be obvious that the same may be varied in many ways. For example, while not described explicitly above, it will be readily apparent that other example price functions may be based on the bandwidth $BW_n^i$ and/or delay $DELAY_n^i$ for the ith routing path and/or other routing paths, such as the jth routing path.

Further, while above-described example embodiments of the present invention have been described with respect to a process performed via a plugin executed at all the mobile Node, it will be readily apparent to one of ordinary skill in the art that the procedural policies above described may be alternatively performed using other well known methods of implementation.

Further, while above-described example routing criteria includes bandwidth, a user-priority metric, etc., it is understood that other example embodiments of the present invention may include other types of routing criteria. For example, the selected routing path may be selected, at least in part, based on a session type classification for the data transfer. Session type classifications may include an audio call (e.g., a conference call, a peer-2-peer call, etc.), a video call (e.g., one way video, two way video, etc.), and/or any other type of well-known data transfer classification. Accordingly, such session type classifications may constitute additional criteria with which a routing path may be selected.

Such variations are not to be regarded as a departure from the example embodiments of the invention, and all such modifications are intended to be included within the scope of the invention.

We claim:

1. A method of sending data from a source node in a wireless communications network, comprising:
   determining, at a source node, a list associated with each of a plurality of available routing paths, each list including parameters for the associated available routing path, at least one of the parameters being selected by an end user; and
   first selecting one of the plurality of available routing paths, from the source node to a destination node, on which to send data based on routing criteria specified by the source node and determined from the parameters in the list.

2. The method of claim 1, wherein the routing criteria is given by a price function.

3. The method of claim 2, wherein the price function includes at least one of (i) a current primary routing path status of the plurality of available routing paths, (ii) a number of hops associated with each of the plurality of available routing paths, (iii) a user-defined priority value associated with each of the plurality of available routing paths, (iv) a known delay from the source node to the destination node along each of the plurality of available routing paths and (v) a known bandwidth from the source node to the destination node along each of the plurality of available routing paths.

4. The method of claim 3, wherein the routing criteria includes a plurality of parameters prioritized in a hierarchical order and including at least two of (i), (ii), (iii), (iv) and (v).

5. The method of claim 4, wherein (iii) is ranked higher in the hierarchical order than (i) or (ii).

6. The method of claim 4, wherein (ii) is ranked higher in the hierarchical order than (i).

7. The method of claim 2, further comprising:
   second selecting another of the plurality of available routing paths; and
   second sending data from the source node to the destination node along the second selected routing path.

8. The method of claim 7, wherein the second selecting step is performed periodically.

9. The method of claim 8, wherein the second selecting step is performed in response to performance degradation on the first selected routing path.

10. The method of claim 1, wherein the routing criteria includes a plurality of parameters prioritized in a hierarchical order.

11. The method of claim 1, further comprising:
    first sending data from the source node to the destination node along the first selected routing path.

12. The method of claim 1, further comprising:
    determining a number of the available routing paths; and
    performing the first selecting step if the number is greater than 1.

13. The method of claim 1, wherein the wireless communications network is a Ad-hoc On-demand Distance Vector (AODV) network.

14. The method of claim 1, wherein the parameters selected by the end user are evaluated based on a price function.

* * * * *